United States Patent [19]
Motter et al.

[11] Patent Number: 5,635,583
[45] Date of Patent: Jun. 3, 1997

[54] CATALYTIC COMPOSITION AND METHOD FOR CURING UREA-FORMALDEHYDE RESIN

[75] Inventors: William K. Motter, Marcola; Nick K. Daisy; William D. Detlefsen, both of Springfield, all of Oreg.

[73] Assignee: Borden Chemical, Inc., Springfield, Oreg.

[21] Appl. No.: 469,824

[22] Filed: Jun. 6, 1995

[51] Int. Cl.$^6$ .......................... C08G 14/04; C08G 14/08; C08G 14/10

[52] U.S. Cl. .......................... 528/243; 528/230; 528/86; 502/172; 502/202; 502/208

[58] Field of Search .......................... 528/120, 230, 528/243, 86; 502/172, 202, 208

[56] References Cited

U.S. PATENT DOCUMENTS

| | | |
|---|---|---|
| 1,460,606 | 7/1923 | Ripper . |
| 1,737,918 | 12/1929 | Cherry . |
| 1,791,062 | 2/1931 | Luther et al. . |
| 1,952,598 | 3/1934 | Luther et al. . |
| 2,015,806 | 10/1935 | Menger . |
| 2,467,212 | 4/1949 | Kvalnes . |
| 2,729,616 | 1/1956 | Bigelow et al. . |
| 3,335,113 | 8/1967 | Dundon . |
| 3,479,175 | 11/1969 | Murphy, Jr. et al. . |
| 3,637,562 | 1/1972 | Orth, Jr. . |
| 4,139,507 | 2/1979 | Sundie et al. . |
| 4,161,467 | 7/1979 | Markessini . |
| 4,209,466 | 6/1980 | Wolf et al. . |
| 4,244,727 | 1/1981 | Moore, Jr. . |
| 4,499,200 | 2/1985 | Carlson .......................... 502/172 |
| 4,537,913 | 8/1985 | Baumann . |
| 4,555,348 | 11/1985 | Moran . |
| 4,626,386 | 12/1986 | Kleiner . |
| 4,781,749 | 11/1988 | Moore . |
| 4,895,983 | 1/1990 | Nakayama et al. . |
| 4,904,516 | 2/1990 | Creamer . |

OTHER PUBLICATIONS

ASTM Designation: D 5582–94 Standard Test Method for Determining Formaldehyde Levels from Wood Products Using a Desiccator; pp. 1–6; reprinted from the Annual Book of ASTM Standards (1994).

Outline of a Fast Durability Test for UF and PF Adhesives in Composite Materials; Proceedings, 20th International Particleboard/Composite Materials Symposium, Washington State University; pp. 105–122 (1986).

Glass–Like Products from Urea Resins; *The Chemistry of Synthetic Resins*, Ellis; pp. 589, 597, 606, 611–612 and 637 (1935).

The Reaction of Urea With Formaldehyde by J.I. De Jong and J. De Jonge; Philips Research Laboratories; 71 RECUEIL pp. 643–659 (1952).

Urea–Formaldehyde Resins; Bent Myers; pp. 169 and 112 (1979).

Kinetics of the Formation of Methylene Linkages in Solutions of Urea and Formaldehyde by J.I. De Jong and J. De Jonge; Philips Research Laboratories; 72 RECUEIL pp. 138–157 (1953).

*Primary Examiner*—James J. Seidleck
*Assistant Examiner*—Duc Truong
*Attorney, Agent, or Firm*—Watson Cole Stevens Davis, P.L.L.C.

[57] ABSTRACT

Disclosed is a binder composition for binding substrates such as wood furnish for particleboard manufacture. The binder comprises a mixture of a first aqueous solution, comprising a buffering salt catalyst and preferably an acid, with a second aqueous solution comprising urea and formaldehyde. Methods of using the buffering salts as catalyst for curing urea-formaldehyde resins are also disclosed.

43 Claims, No Drawings

CATALYTIC COMPOSITION AND METHOD FOR CURING UREA-FORMALDEHYDE RESIN

BACKGROUND OF THE INVENTION

1. Field of the Invention

The present invention relates to binders comprising urea-formaldehyde resins which contain high levels of buffering salts and use of the buffering salts to speed cure of the urea-formaldehyde resins.

2. Background Discussion

A buffered system is one in which little or no change in pH occurs with the addition of small quantities of an acid or base. When added to a system, buffer-inducing materials (e.g., potassium phosphates, sodium acetate), tend to buffer systems over a fairly specific pH range. The pH range over which the system is buffered will vary, depending on the type of buffering material employed. Some buffer-inducing materials buffer over more than one specific pH range. For example, potassium phosphates buffer over the pH ranges 1 to 3, 6 to 8 and 11 to 13. Thus, when dipotassium phosphate is added to a UF resin, the resin exhibits a relatively strong resistance to a change in pH with addition of acid or base in the pH ranges from about 1 to 3, 6 to 8 and 11 to 13. Outside of these ranges of buffering action, the pH can be changed with the addition of small quantities of acid or base. Other salts are considered as being "neutral." These types of salts do not induce a buffer when added to aqueous systems. Examples of these are sodium chloride, sodium sulfate, potassium chloride, and magnesium chloride. In general, neutral salts are made from the combination of a strong acid with a strong base, whereas buffering salts are made from the combination of a weak acid and a strong base, or alternately, a weak base and a strong acid.

Urea-formaldehyde (UF) adhesive resins are employed in a wide range of wood bonding systems. These include hot-press particleboard, medium-density fiberboard, and plywood applications, among others. Urea-formaldehyde resins are often referred to as thermosets, which rely upon heat to obtain adequate cure in a reasonable period of time. It is well understood that UFs may be cured at ambient temperatures by catalysis with free acid. In practical uses, a combination of a moderate increase in acidity and elevated temperatures is generally employed to achieve cure. To make particleboard, it is common to rely upon the acidity inherent in the wood furnish to provide reduced pH for cure, the pH normally varying from about pH 4–6.5, depending on the wood species. UF resins are only storage stable at pH's above 7.0. Thus, resins generally contain small, e.g., 0 to 0.3 weight percent, of buffer so that minimal resistance to a drop in pH is exhibited by the resin when sprayed onto and intimately mixed with the wood furnish. Alternately, latent catalysts, or free acid itself, may be added if faster cure speeds are required such as in core-layers which heat more slowly in comparison to surfaces, or when using high pH woods, or in particular for plywood applications wherein intimate mixing of the resin and wood is not achieved and therefore minimal pH drop is experienced by the resin. Latent catalysts commonly employed include amine-acid salts, such as $NH_4Cl$ and $(NH_4)_2SO_4$, which react with free formaldehyde generated during cure, and subsequently release free acid. Other non-buffering inorganic salts are also used to enhance cure speed. Examples of these include $MgCl_2$, $MgSO_4$, $NaCl$ and $Na_2SO_4$. The exact mechanism by which these salts enhance cure speed in UF adhesive systems is not presently known, and may vary depending upon the salt.

As mentioned, except in certain circumstances, particleboard resins are generally made so that they exhibit a low degree of resistance to a drop in pH, i.e., they are generally low buffered so that with intimate mixing of the resin with wood surfaces, a sufficient drop in pH for speedy cure of the glue will occur. Usually, only a minimal amount of buffering is employed to enhance storage life of the UF resin. This small amount of buffering prevents the pH of the resin from dropping below about 7.5 during storage. There are instances in which buffering salts are employed so that cure of the resin is prevented until such time that the formed mat of resin plus wood reaches the hot press. This is at times necessary because, after blending the resin with wood furnish, a significant amount of time may pass before the resin-treated furnish mixture reaches the pressing station. Since the wood furnish is almost always warm due to previous drying procedures, and many times the manufacturing plant itself is very warm, the acidity of the resin may increase and begin curing before consolidation for the mat in the press, which can result in reduced board properties. Therefore, it has been the practice to employ the use of buffering agents to slow the cure of the resin by retarding the drop in pH in cases wherein precure may occur as described above. It is commonly believed and accepted that buffering-type salts included in particleboard resins will only slow their cure. Thus, only the least amount of buffering salts necessary to prevent precure are employed. In plywood applications, buffers are again usually kept to a minimum because latent catalysts must be employed to overcome the buffer in order to reduce the adhesive pH significantly below pH 7.0 to promote cure.

Generally speaking, it is an advantage to impart faster cure to UF resins. The time required during the pressing stage is usually the deciding factor which limits the total possible production in most wood composite panel manufacturing processes. Therefore, any catalyst which can speed cure, i.e., which will impart improved performance properties at shorter press times, is desired. Shortening the press time by only a few seconds can result in considerable increases in profits to board manufacturers.

An increasing problem in the use of UF resins faced by panel producers during the past 10 to 15 years has been the requirement for lower formaldehyde-emitting panel products. To meet this demand for lower fuming products, resin producers have moved to resins with lower F/U molar ratios. In general, lower-fuming resins result in reduced board properties, due to a lower extent of cure. Also, the resins tend to be slower curing than the higher mole ratio, higher fuming, more reactive resins of the past. Because of this, new catalyst systems which might improve board properties (especially at short press times), while maintaining equivalent formaldehyde emission potential, would have a large economic benefit for board producers. Equally, board manufacturer's total plant emissions of formaldehyde and other volatile organic compounds (VOCs) which arise during pressing, board cooling, and at other locations in the various manufacturing steps have recently become an important factor that may limit plant production. It is critical that board manufacturers are able to either reduce stack emissions by using lower fuming resins, or by increasing production (with the same total stack emission level) by employing faster curing resins which exhibit equivalent or lower formaldehyde fuming potential.

The book by B. Meyer, "Urea-Formaldehyde Resins" (Addison-Wesley Publishing Company, 1979) reviews UF resin chemistry patent and journal literature from the turn of the century up to about 1979. Meyer's book covers the use of UF resins in the manufacture of cast polymer glasses and as wood adhesives. Meyer points out that the traditional use of buffers in UF resins has been that of pH control. On page 112 he notes that in cold set wood adhesive applications where high acid contents are required for cure, buffers may be used to prevent the pH of the acid catalyzed system from going too low. Overly low pH would result in degradation of the glued joint. On page 169 he points out that all particleboard UF resins are buffered to some degree, but the level may be controlled to prevent pH changes when necessary or advantageous. U.S. Pat. No. 3,335,113 to Dundon (column 2, lines 45–55) indicates the same type of considerations must be made in the use of UF resin for textiles. U.S. Pat. No. 1,460,606 to Ripper points out the retarding of cure and the rate of reactions by buffering agents.

In the very early use of UF resins for manufacture of polymer glasses (up to about 1940), buffers were commonly employed as pH modifiers and pH control agents during resin manufacture as taught by U.S. Pat. No. 1,737,918; 1,791,062; 1,952,598; 2,015,806; 2,647,212; and 2,729,616, and also more recently in U.S. Pat. No. 3,637,562 and 4,139,507. It must be realized that in the early part of this century, measurement of pH was difficult task, and therefore buffer systems were employed so that pH monitoring was not necessary. This is particularly important for UF reactions since the rates of reactions are critically dependent upon pH. In no instance are buffers referred to as cure catalysts, but rather, where applicable in these patents, it is found necessary that free acid or acid generating salts are employed to overcome buffers to achieve adequate cure. In no case is it suggested that the presence of such neutralized buffers result in enhanced cure speed of any sort. For example, U.S. Pat. No. 1,952,598 to Luther discloses buffers are inert materials, and take no part in the UF reaction process other than as pH control agents.

The use of buffering-type salts have also been employed in the use of UF resin for high nitrogen fertilizers. In these instances buffers are used either as a source of potassium and phosphorus for fertilizers (3,479,175) or for pH control during manufacture of the low condensed resin (4,781,749 and 4,895,983). Cure is not usually a consideration for fertilizer resins, but in U.S. Pat. No. 4,244,727 low levels of buffering are employed during manufacture of a UF resin fertilizer. This is analogous to the traditional requirements for minimal buffering to achieve cure in wood technology adhesive applications.

There are two reactions involved in reacting urea and formaldehyde resins: an "addition" reaction and a "condensation" reaction. These reactions are discussed in detail elsewhere in present specification. However, it is noted that buffer salts are known to accelerate the addition reaction between urea and formaldehyde to form methylolureas according to De Jong and De Jonge, Recueil Trav. Chim., 71, p.p. 643–660 (1952). The condensation reaction, which leads to polymer growth, high molecular weight and cure, has been explicitly reported to not be affected by buffering agents as taught by De Jong and De Jonge, Recueil Trav. Chim., 72, p.p. 139–156 (1953).

OBJECTS OF THE INVENTION

An object of the present invention is to provide an improved urea-formaldehyde binder composition comprising high levels of buffer curing catalyst that avoids the disadvantages and defects of the prior art.

Another object of the present invention is to provide a method for rapid curing of urea-formaldehyde resin.

Various other objects, advantages, and features of this invention will be readily apparent from the following detailed description and appended claims.

SUMMARY OF THE INVENTION

The present invention provides a new type of catalyst system for UF resins for binding fibrous substrate. Specifically, the catalyst system comprises an aqueous solution of a buffering salt (preferably a phosphate), adjusted to a pH of about 8.5 to about 2.0. The pH selected will depend on the buffer range of the salts employed and how the salts will be used. Preferably, the pH ranges from about 6 to about 3.5. The present invention also provides a method wherein the catalyst solution is combined with the UF resin just prior to blending with fibrous substrate to be bound, e.g., the wood furnish in particleboard manufacture. The level of salt employed is about 0.05 to about 15% as a function of total liquid resin weight. The buffering salt solution most preferably includes an acid to achieve a pH in the lower half or below a buffering range of the buffering salt solution.

It is surprising to employ a buffering salt such as dipotassium phosphate as a catalyst for particleboard resins because such salts are thought to only slow cure. It is important to pre-adjust the pH of the aqueous buffer-catalyst solution significantly into or below its buffering range, to both activate the catalytic effect, and to minimize or eliminate the salt's buffering action. The buffering salts act as exceptionally effective cure catalysts when they are partially or wholly neutralized as in the present invention. It is not necessary to completely neutralize the buffering action of the salts since some reduction in pH could be achieved through the use of high acid wood or additional acid catalysts.

Moreover, the buffering salt is preferably post-added to the UF resin, so the buffering salt is not present during resin manufacture or storage. Advantageously, the invention provides the use of the buffering salt (preferably a phosphate) as a UF resin catalyst to achieve fast cure speed without increasing formaldehyde emissions during manufacture of particleboards or other bound materials.

DETAILED DESCRIPTION OF THE PREFERRED EMBODIMENTS

The present invention provides an effective binder composition and binding method which achieves fast strong cure of urea-formaldehyde (UF) resins with minimal residual free formaldehyde.

The binder composition is a mixture of a first aqueous solution comprising UF resin and a second aqueous solution comprising at least one acidified buffering salt. This first aqueous solution is a conventional aqueous solution of UF resin. The second aqueous solution contains acidified buffering salt for catalyzing cure of the resin. The buffering salt has been acidified so the second solution has a pH of about 2.0 to about 8.5. Preferably employed is a pH of about 3.5 to about 6, more preferably about 4 to about 6 and most preferably about 4 to about 5. These preferred ranges are especially suitable for phosphate buffers. If desired, co-catalysts may also be present as discussed below.

Typically, the acidified second aqueous solution has been acidified sufficiently by acids, such as formic, sulfuric, acetic, hydrochloric, citric, phosphoric, or nitric acids, so the pH of the acidified aqueous solution is below or in a lower half of at least one buffering range of at least one of the buffering salt catalysts. In the preferred embodiment, the pH of the acidified aqueous catalyst solution is in the lower quarter or, more preferably, below the pH of a buffering salt in the solution such that the buffering salt no longer buffers the solution.

Preferably, the acidified aqueous solution of buffering salt catalyst is blended with the UF resin just prior to application of the resin onto the substrate, e.g., wood surfaces. The amount of the buffering salt and the final pH of the catalyst system would depend on the type of material, e.g., wood, being bound and the resin being employed. For wood particleboard manufacture, the pH should preferably be below the buffer range for the salts so as to not induce a buffer into the resin in the expected curing pH ranges.

The Buffering Salts

Dipotassium phosphate is only one of many buffering salts which will work as a UF curing catalyst. In general, any salt or salt combination which would normally induce a buffer into the resin when added, will work. For example, it is possible to prepare a catalyst solution using mono-, di- or tri- potassium phosphate, or alternately, to prepare a catalyst solution by charging the appropriate amount of potassium hydroxide and phosphoric acid separately to form the phosphate buffer in site. Other types of buffering salts which will work include, but are not limited to, salts of alkaline hydroxides and relatively weak inorganic and organic acids such as sodium acetate, sodium formate, sodium citrates, mono-, di- or tri- sodium phosphates, mono-, di or tri- potassium phosphates, borates, e.g., borax, phthalates, bicarbonates and mixtures thereof. The various buffering salt catalysts have different buffering ranges. For example, dipotassium phosphate has three buffering ranges of about 1 to about 3, about 6 to about 8 and about 11 to about 13. Sodium acetate has a buffering range of about 4 to about 6. Sodium formate has a buffering range of about 3 to about 5.

The Urea Formaldehyde Resin

The urea formaldehyde (UF) resins for which the buffering salts of the present invention are applicable include a wide range of urea-formaldehyde binder systems such as those employed in particleboard, medium density fiberboard (MDF), plywood and glass mat, or any other industrial UF adhesive resin application. It is applicable to modified UF resins including melamine-modified, ammonia-modified UF resins and phenol-modified UF resins, or other modified UF or MUF (melamine urea formaldehyde) resins, as long as the cure of the system relies either primarily or even partially upon the cure speed of the UF or MUF portion of the resin system. The buffering salt will catalyze curing of resin in cold-press applications as well as the hot pressing or heat-cured applications listed above.

Normally, the UF resin is sold to a customer as an aqueous solution containing water, urea, formaldehyde and conventional ingredients. Conventional ingredients include pH modifiers, employed during resin manufacture, such as formic acid, sulfuric acid, sodium hydroxide and/or amines. Moreover, ammonia and melamine are common co-reactants with urea and formaldehyde.

The urea formaldehyde (UF) resins, whose cure is catalyzed by the pre-acidified aqueous solutions of buffering salts are conventional UF resins known in the art. The resins have a urea to formaldehyde molar ratio of about 0.33 to about 1.67:1. Preferably, the resins have a U:F molar ratio of about 0.62–1.67:1.

Generally, the U:F mole ratio at the beginning of resin manufacture ranges from about 0.4 to about 0.6:1. The mixture of urea and formaldehyde is first adjusted to a mildly alkaline pH via addition of sodium hydroxide or amine, such as triethanol amine, or ammonia and allowed to react at a pH from about 7.0 to about 8.5. Generally, this mixture of urea and formaldehyde is allowed to react at temperatures from about 140° to about 212° F. During this time, the formation of "addition products" of urea and formaldehyde occur. Addition products include mono-, di- and tri- methylolureas. After a short period of time, the pH of the solution is generally reduced to below 7.0 to initiate a "condensation" reaction. The condensation reaction transforms the aforementioned methylolureas to methylene linked oligomers, ultimately resulting in polymeric materials of high molecular weight.

At the completion of the polymer formation, the UF resinous material is neutralized. Then urea may be added to, and thoroughly mixed with the UF resinous material to lower the free formaldehyde and fuming potential of the resin. Common final U:F mole ratios are about 0.62 to about 1.67:1. For particleboard manufacture, preferred final U:F mole ratios are about 0.7 to about 1.1:1 and a very typical final U:F mole ratio is about 0.9:1. This manufacturing method results in the UF resin having a free urea content of about 0 to about 40 weight percent, preferably about 10 to about 30 weight percent, and a free formaldehyde content of 0 to 2 weight percent. To complete the cure of such a UF resin, further condensation reaction is induced by reducing the pH to below 7.0.

Additional Ingredients

The aqueous buffering salt solution may also include non-buffering salts. Such salts include but are not limited to co-catalysts such as salts already known to be employed as cure catalysts for UF resins, including the neutral salts, e.g., sodium chloride, sodium sulfate, magnesium chloride, or magnesium sulfate, and various acid forming salts, i.e., latent catalysts, such as ammonium sulfate, ammonium formate, ammonium phosphate, ammonium acetate and/or ammonium chloride.

The effectiveness of such additional salts will ultimately depend upon the quantity and type of buffering salt catalyst employed.

Method of Making and Using the Buffering Salt Catalyst-Containing Resin

An aqueous solution of buffering salt is made by mixing a sufficient amount of one or more buffering salts with water to obtain an aqueous solution comprising about 0.5 to about 50 weight percent buffering salt and about 50 to about 95.5 weight percent water. Then, sufficient acid is added to the aqueous solution to provide the aqueous solution with a pH of about 2.0 to about 8.5, preferably about 3.5 to about 6, more preferably about 4 to about 6 and most preferably about 4 to about 5. The pH is below or in the lower half of at least one buffering range of at least one buffering salt in the solution. Preferably, the pH is below or in the lower quarter of at least one buffering range of at least one buffering salt in the solution.

It is preferred that the majority of the acid required to neutralize the buffer induced by the buffering salt is added to the aqueous solution of buffering salt before the buffering salt is added to the resin. Adding strong acids directly to the resin causes undesirable premature or localized gelling. The binder contains about 0.05 to about 15 weight percent buffering salt catalyst based on total weight per resin (including water). Preferably, the binder contains about 0.5 to about 10 weight percent buffering salt catalyst, more preferably, about 0.5 to about 5 weight percent buffering salt catalyst, or most preferably, about 0.5 to about 3.0 weight percent buffering salt catalyst based on total weight of resin.

The level of buffering salt catalyst can be varied over a wide range, depending on the application, type of resin employed, and type of buffering salt employed. The total may also be dependent upon the pH range in which the salt employed induces a buffer. The upper range of concentration for some salts may be limited by their solubility. The upper range may also be limited in cases where high levels of buffering salts might increase formaldehyde emissions of panel products. If a negative impact is otherwise not observed, conventional formaldehyde scavengers may be employed.

The aqueous acidified solution is mixed with the UF resin, just prior to mixing the UF resin with a substrate, e.g., wood for particleboard manufacture. The mixing occurs at a temperature of from about 60° to about 100° F. depending on conditions in the board manufacturing facility. The UF resin and aqueous acidified buffering salt solution are mixed instantaneously or for up to about 120 minutes to make the binder, depending on equipment and conditions in the board manufacturing facility. Then the binder is mixed with the substrate, e.g., wood. Typically, the mixing of the aqueous catalyst solution and UF resin occurs just prior to mixing the resulting binder with the substrate because the resin binder characteristics may change rapidly. After the binder and substrate are mixed, the substrate is processed to its final form, e.g., wood particleboard.

The pH of the catalyst solution ideally should be low enough that the buffer effect of the salt has effectively been neutralized. This would assure that little or no buffer is retained by the resin which would retard a further drop in pH, unless this is otherwise desired. In this way, the pH of the resin will be reduced easily in the press (which forms the boards) into the cure range of UF resins by either the natural acidification by the wood surfaces, or by the use of small quantities of other latent acid generating catalysts. If the pH of the buffering salt catalyst is not adjusted below its pH buffering range, additional free acid or acid generating salts may have to be added to achieve fast cure.

It is possible for the catalyst system to contain a buffering salt such that it buffers the resin system in the cure range required for UF resins to cure. It is possible that the catalyst can be comprised of a combination of acidified buffering salts, that if not acidified would normally buffer the resin in the same or different pH regions.

Rather than mixing the buffering salt catalyst and UF resin to make the binder just prior to application onto the wood, the UF resin may be mixed at an earlier time with the catalyst. In some cases, this type of system might require subsequent acidification by adding latent catalyst, free acid, or acid generating salts to the binder in order to obtain adequate cure.

The resin and buffering salt catalyst mixture is typically sprayed onto the substrate, e.g., the plywood sheets or wood furnish, and this mixture is then pressed to form plywood or particleboard, respectively. Particleboard composition typically ranges from about 5 to about 12 weight percent resin solids and about 95 to about 88 weight percent furnish.

EXAMPLES

The following Examples illustrate the effectiveness of the present invention. In the Examples, homogeneous particleboards were made using standard nominal 60% solids, the particleboard resin has a U:F mole ratio of about 0.9:1. In all examples (except those with control resins) the resin was combined with aqueous catalyst solution just prior to blending with furnish. Panels were also made using a control resin which contained no catalyst. In each case the resin or resin plus catalyst was sprayed onto the furnish in the normal manner for particleboard manufacture. The particleboard manufacturing parameters are generally as follows:

Target 46 lb/ft$^3$ panel density, ⅝ in thickness, homogeneous lay up 6.5% resin solids treatment 9.5% mat moisture content 350° C. platen temperature for pressing Press time includes 60 sec. close and 20 sec. decompression Resins were made by reacting a mixture having a urea:formaldehyde mole ratio of about 0.48:1 to form a resinous mixture, and then adding more urea to result in a resin having a urea:formaldehyde mole ratio of about 0.9:1.

Furnish:Douglas Fir/Pine mixture

EXAMPLES 1–4

Following the above manufacturing parameters, the particleboards of Examples 1–4 were made with no pH adjustment of catalyst solution or resin mixes and employed the materials listed in the following TABLE I.

TABLE I

Resin 59.83 weight percent N.V. (non-volatiles)
$K_2HPO_4$ (DPP) added at 0.91 weight percent of total resin
Ammonium sulfate (ASS) added at 0.73 weight percent of total resin

| Example | Binder Mix | Resin (g) | 50% DPP/ 50% water soln. (g) | 40% AS/ 60% water soln. (g) | Water (g) |
|---|---|---|---|---|---|
| 1 | Control | 395.4 | 0 | 0 | 53.9 |
| 2 | 0.91 weight percent DPP | 395.4 | 7.2 | 0 | 46.7 |
| 3 | 0.91% DPP + 0.73% AS | 395.4 | 7.2 | 7.2 | 39.5 |
| 4 | 0.73% AS | 395.4 | 0 | 7.2 | 46.7 |

The resin and DPP and/or AS were mixed at ambient temperature. Then the water listed in the last column of TABLE I was added to adjust the moisture content of the "mat" (i.e., board precursor) to about 9.5%. Then the mixture was let stand for about 1–2 minutes and sprayed on the furnish.

Board results are given in TABLE II below. Dry shear results indicated that only those resins containing ammonium sulfate (AS) accelerated cure. By 4.5 minutes press time, all salt containing resins had begun to degrade, while the control still increased in strength. The combination of dipotassium phosphate (DPP) and AS exhibited the fastest cure, and may have already been degrading by the earliest press time of 3 minutes. DPP by itself did not accelerate cure. This is probably because the addition of the DPP solution induced a fairly strong buffer from the pH range of about 6 to 8. In Examples 1–4, no pH adjustment of the DPP catalyst solution was made. In the following examples, the solution was pre-adjusted to pH 4.0 to remove the buffer effect. Pressure cooked shear decreased when AS was present. The DPP catalyst did not appear to affect pressure cooked shear. The presence of DPP caused minor or no increase in formaldehyde emissions. But the fastest curing system (DPP+AS) exhibited lower emissions than the control.

TABLE II

| Example | Resin | Press Time (min)[1] | Dry Shear IB (psi)[2] | Pressure Cooked Shear (psi)[2] | Desiccator Emissions (ug/ml)[3] | Board Density (bl/cf) |
|---|---|---|---|---|---|---|
| 1 | Control | 3 | 346 | 224 | 0.62 | 46.6 |
|   |         | 3.75 | 424 | 234 | — | 46.9 |
|   |         | 4.5 | 429 | 258 | 0.61 | 46.5 |
| 2 | 0.91% DPP | 3 | 347 | 209 | 0.79 | 46.9 |
|   |   | 3.75 | 423 | 263 | — | 46.7 |
|   |   | 4.5 | 386 | 245 | 0.65 | 46.8 |
| 3 | 0.91% DPP + 0.73% AS | 3 | 416 | 192 | 0.55 | 46.9 |
|   |   | 3.75 | 402 | 201 | — | 46.6 |
|   |   | 4.5 | 379 | 214 | 0.37 | 47.2 |
| 4 | 0.73% AS | 3 | 388 | 199 | 0.34 | 47.3 |
|   |   | 3.75 | 430 | 180 | — | 47.2 |
|   |   | 4.5 | 379 | 197 | 0.31 | 47.3 |

[1]Press time is the length of time to apply heat and pressure to cure the resin.
[2]Dry and pressure cooked shears are measures of particleboard internal bond. The dry and pressure cooked shear tests are described by W. F. Lehmann, Outline of a Fast Durability Test for UF and PF Adhesives in Composite Materials, Proceedings, 20th International Particleboard/Composite Materials Symposium, Washington State University (1986).
[3]Desiccator Value is a measure of formaldehyde emissions from particleboard. The Desiccator Value is measured according to ASTM Standard Test Method D5582-94, Annual Book of ASTM Standards (1994), with the minor change of shortening the conditioning of specimens to only 2-3 days.

EXAMPLES 5-7

Following the above manufacturing parameters, the particleboards of Examples 5-7 were made. The U:F ratio of the resin during its initial preparation was about 0.48:1 and its final U:F ratio was about 0.9:1. However, just prior to blending with the furnish, the aqueous resin (other than the control resin) was combined with a sufficient quantity of aqueous catalyst solution having a pH pre-adjusted to 4.0. The materials listed in TABLE III were employed.

TABLE III

Resin 59.75 weight Percent N.V. (non-volatiles)
DPP catalyst solution adjust to pH 4.0 ($H_3PO_4$) before dilution to final concentration.
No pH adjustment of control resin or binder mix prior to blender application.
DPP added at 1.0 weight percent of total resin.
Ammonium sulfate (AS) added at 0.5 weight percent of total resin.

| Example | Binder Mix | Resin (g) | 10% DPP/ 90% water soln. (pH 4.0) (g) | 20% AS/ 80% water soln. (g) | Water (g) |
|---|---|---|---|---|---|
| 5 | Control | 396 | 0 | 0 | 56.8 |
| 6 | 1.0% DPP | 396 | 40 | 0 | 16.8 |
| 7 | 1.0% DPP + 0.5% AS | 396 | 40 | 10 | 6.8 |

The resin and DPP and/or AS were mixed at ambient temperature. Then the water listed in the last column of TABLE III was added to adjust the moisture content of the mat to about 9.5%. Then the mixture was let stand for about 1-2 minutes and sprayed onto the furnish.

The DPP catalyst solution was pre-adjusted to pH 4.0 before adding it to the resin mixes. This removed any buffer influence the catalyst solution may have imparted in Examples 1-4. Though mix pHs were not recorded, resin containing DPP was probably about pH 6.0, while the control was approximately pH 7.5. Since the control resin was low buffered, this difference in initial pH should have had little impact on pH drop into the expected cure range of pH 4-6 induced by the wood. Board data is given in TABLE IV. The combined catalyst mix (DPP+AS) attained close to full cure by 2.25 minutes, the shortest press time. Control boards never achieved the dry strength of either DPP by itself, nor the DPP/AS combination, at any press time. Pressure cooked shear results suggest no impact of DPP alone. The combination of DPP+AS caused lower shear values at press times greater than 2.5 minutes. DPP induced little or no increase in desiccator emissions over the control. The combined catalyst mix, as before, resulted in significantly lower emissions at all press times.

TABLE IV

| Example | Resin | Press Time (min)[1] | Dry Shear IB (psi)[2] | Pressure Cooked Shear (psi)[2] | Desiccator Emissions (ug/ml)[3] | Board Density (bl/cf) |
|---|---|---|---|---|---|---|
| 5 | Control | 2.25 | 258 | 206 | — | 43.8 |
|   |   | 2.5 | 300 | 212 | 0.69 | 45.2 |
|   |   | 2.75 | 319 | 250 | — | 45.0 |
|   |   | 3 | 330 | 226 | 0.73 | 45.7 |
|   |   | 3.5 | 343 | 235 | — | 45.9 |
|   |   | 4 | 397 | 277 | 0.58 | 45.8 |
| 6 | 1% DPP | 2.25 | 336 | 224 | — | 44.1 |
|   |   | 2.5 | 375 | 233 | 0.85 | 45.2 |
|   |   | 2.75 | 382 | 213 | — | 45.8 |
|   |   | 3 | 420 | 254 | 0.69 | 45.5 |
|   |   | 3.5 | 433 | 272 | — | 46.2 |
|   |   | 4 | 421 | 230 | 0.68 | 46.6 |
| 7 | 1% DPP + 0.5% AS | 2.25 | 450 | 229 | — | 45.5 |
|   |   | 2.5 | 454 | 225 | 0.57 | 46.1 |
|   |   | 2.75 | 466 | 200 | — | 46.8 |
|   |   | 3 | 472 | 179 | 0.55 | 45.9 |
|   |   | 3.5 | 431 | 198 | — | 46.4 |
|   |   | 4 | 445 | 210 | 0.47 | 46.5 |

Footnotes - See TABLE II

EXAMPLES 8-12

Following the above manufacturing parameters, the particleboards of Examples 8-12 were made. Just prior to blending with the furnish, the resin (other than the control resin) was combined with a sufficient quantity of aqueous catalyst solution having a pH pre-adjusted to 4.0. The materials listed in TABLE V were employed.

TABLE V

Resin 59.69 weight percent non-volatiles.
DPP solution adjusted to pH 4.0 ($H_3PO_4$) prior to dilution to final concentration.
No pH adjustment of control resin or resin mixes prior to blender application.
DPP added at 1.0 weight percent of total resin.
AS added at 0.5% of total resin.
Sodium sulfate (SS) added at 0.5 weight percent of total resin.

| Example | Binder Mix | Resin (g) | 12% DPP/88% water soln. (pH 4.0) (g) | 20% AS/ 80% Water soln. (g) | 20% SS/ 80% Water soln. (g) | Water (g) |
|---|---|---|---|---|---|---|
| 8 | Control | 396.3 | 0 | 0 | 0 | 43.7 |
| 9 | 1.0% DPP | 396.3 | 33.3 | 0 | 0 | 10.4 |
| 10 | 1.0% | 396.3 | 33.3 | 10 | 0 | 0.4 |

TABLE V-continued

Resin 59.69 weight percent non-volatiles.
DPP solution adjusted to pH 4.0 ($H_3PO_4$) prior to dilution
to final concentration.
No pH adjustment of control resin or resin mixes prior to
blender application.
DPP added at 1.0 weight percent of total resin.
AS added at 0.5% of total resin.
Sodium sulfate (SS) added at 0.5 weight percent of total resin.

| Example | Binder Mix | Resin (g) | 12% DPP/88% water soln. (pH 4.0) (g) | 20% AS/ 80% Water soln. (g) | 20% SS/ 80% Water soln. (g) | Water (g) |
|---|---|---|---|---|---|---|
| 11 | DPP + 0.5% AS 0.5 AS | 396.3 | 0 | 10 | 0 | 33.7 |
| 12 | 1.0% DPP + 0.5% SS | 396.3 | 33.3 | 0 | 10 | 0.4 |

The resin and DPP and/or AS and/or SS were mixed as aqueous solutions at ambient temperature. Then the water of the last column of TABLE V was added to adjust the moisture content of the mat to about 9.5%. Then the mixture was let stand for about 1 to about 2 minutes before being sprayed onto the furnish.

The DPP solution was adjusted to pH 4.0 prior to addition to the resin mixes. Board data is given in TABLE VI. Dry shear data indicates the catalyst combination of DPP+AS outperformed all others at all but the longest press time. This was also the only mix that made board at 1.83 minutes. The performance of the DPP and AS catalyzed resins were about equal, both faster than the control, but not as fast as the DPP+AS catalyst mix. The DPP+SS catalyst mix never improved much beyond the low values exhibited at the short press time. Pressure cooked shear performance of the DPP+AS catalyst mix was poor. Ammonium sulfate and DPP alone were better than the control at short press cycles, but lower than the control at longer press times. Desiccator emissions showed trends similar to those in Examples 1–7. That is AS strongly reduced emissions, while DPP resulted in little or no increase in emissions.

TABLE IV

| Example | Binder Mix | Press Time (min)[1] | Dry Shear IB (psi)[2] | Pressure Cooked Shear (psi)[2] | Desiccator Emissions (ug/ml)[3] | Board Density (bl/cf) |
|---|---|---|---|---|---|---|
| 8 | Control | 2 | blow | — | — | — |
| | | 2.25 | 309 | 208 | 0.61 | 43.8 |
| | | 3 | 428 | 278 | 0.66 | 45.0 |
| | | 4 | 483 | 290 | 0.61 | 45.9 |
| 9 | 1% DPP | 2 | 309 | 195 | 0.78 | 43.6 |
| | | 2.25 | 410 | 246 | 0.68 | 45.5 |
| | | 3 | 434 | 255 | 0.68 | 46.0 |
| | | 4 | 442 | 239 | 0.51 | 46.0 |
| 10 | 1% DPP + 0.5% AS | 1.75 | blow | — | — | — |
| | | 1.83 | 343 | 146 | 0.60 | 43.9 |
| | | 2 | 395 | 183 | 0.62 | 44.8 |
| | | 2.25 | 437 | 198 | 0.52 | 45.2 |
| | | 3 | 467 | 197 | 0.56 | 46.2 |
| | | 4 | 437 | 206 | 0.43 | 46.4 |
| 11 | 0.5% AS | 2 | 372 | 216 | 0.48 | 44.7 |
| | | 2.25 | 398 | 240 | 0.43 | 45.5 |
| | | 3 | 426 | 256 | 0.47 | 45.9 |

TABLE IV-continued

| Example | Binder Mix | Press Time (min)[1] | Dry Shear IB (psi)[2] | Pressure Cooked Shear (psi)[2] | Desiccator Emissions (ug/ml)[3] | Board Density (bl/cf) |
|---|---|---|---|---|---|---|
| | | 4 | 433 | 262 | 0.36 | 46.2 |
| 12 | 1% DPP + 0.5% SS | 2 | 230 | 142 | 0.83 | 43.1 |
| | | 2.25 | 370 | 225 | 0.69 | 45.0 |
| | | 3 | 388 | 222 | 0.76 | 45.6 |
| | | 4 | 402 | 247 | 0.55 | 46.3 |

Footnotes - See TABLE II

EXAMPLES 13–16

Following the above-manufacturing parameters, the particleboards of Examples 13–16 were made. Just prior to blending with the furnish, the resin (other than the control resin) was combined with a sufficient quantity of aqueous catalyst solution having a pH pre-adjusted to 5.75. The materials listed in TABLE VII were employed.

TABLE VII

Resin 59.20% non-volatiles.
DPP solution adjusted to pH 4.0 ($H_3PO_4$) prior to dilution to final concentration.
Control resin A not pH adjusted prior to blending
Control resin B, DPP and NaCl mixes were adjusted to pH 5.75 prior to blending.
DPP and NaCl added at 1.0% of total resin.

| Example | Binder Mix | Resin (g) | 12% DPP/ 88% water soln. (pH 4.0) (g) | 12% NaCl/ 88% water soln. (g) | Water (g) |
|---|---|---|---|---|---|
| 13 | Control A | 399.7 | 0 | 0 | 86.5 |
| 14 | 1.0% DPP (pH 5.75) | 399.7 | 33 | 0 | 53.5 |
| 15 | Control B (pH 5.75) | 499.6 | 0 | 0 | 108.1 |
| 16 | 1.0% NaCl (pH 5.75) | 499.6 | 0 | 41.3 | 66.9 |

The resin and DPP or NaCl were mixes at ambient temperature. Then the water of the last column of TABLE VII was added to adjust the moisture content of the "mat" to about 9.5%. Then the mixture was let stand for about 1 to about 2 minutes before being sprayed onto the furnish.

Except for a series of boards with Control A, the resins were all adjusted to pH 5.75 prior to blending. This was the final pH of the resin plus DPP mix. Example 16 employs a resin containing 1% sodium chloride, adjusted to pH 5.75. Sodium chloride is a commonly employed catalyst for resins in particleboard manufacture.

Board data is given in TABLE VIII. No desiccator emission tests were run. The DPP catalyzed resin showed faster cure. There was very little difference among any of the resins after 2.25 minutes press time. The fact that the cure speeds of the two control resins were equivalent indicates the initial pH of the mix had no impact on dry shear strength development. Pressure cooked shears indicate the DPP and NaCl containing boards suffered slightly in comparison to the control panels.

TABLE VIII

| Example | Resin | Press Time (min)[1] | Dry Shear IB (psi)[2] | Pressure Cooked Shear (psi)[2] | Board Density (bl/cf) |
|---|---|---|---|---|---|
| 13 | Control A | 2 | 145 | 100 | 42.3 |
|  |  | 2.25 | 276 | 200 | 44.8 |
|  |  | 2.75 | 311 | 192 | 46.0 |
|  |  | 3.25 | 328 | 215 | 46.8 |
| 14 | 1% DPP | 2 | 195 | 107 | 43.6 |
|  | (pH 5.75) | 2.25 | 285 | 171 | 45.5 |
|  |  | 2.75 | 306 | 188 | 46.1 |
|  |  | 3.25 | 314 | 190 | 47.1 |
| 15 | Control B | 2 | 127 | 93 | 42.6 |
|  | (pH 5.75) | 2.25 | 275 | 190 | 5.0 |
|  |  | 2.75 | 265 | 211 | 46.1 |
|  |  | 3.25 | 317 | 212 | 46.6 |
| 16 | 1% NaCl | 2 | 147 | 93 | 43.1 |
|  | (pH 5.75) | 2.25 | 270 | 163 | 44.8 |
|  |  | 2.75 | 289 | 185 | 6.0 |
|  |  | 3.25 | 314 | 209 | 46.9 |

Footnotes - See TABLE II

In Examples 6–7 and 9–12, the buffering salt catalyst resin was at a lower pH than the control just prior to resin addition to the furnish. This is because the aqueous salt catalyst solution is at a pH of 4.0 so that, when added to the resin, a pH of about 5.7 resulted. The pH of the control resins in Examples 1, 5 and 8 were not adjusted to this lower pH. This is because it is generally assumed that the pH of the wood furnish controls cure pH. In contrast, the pH of the resins of Examples 14 and 16, as well as the control resin of Example 15, were reduced to pH 5.75 prior to application to the wood furnish.

The data of TABLE VIII indicate that it is not the initial resin pH prior to resin application to the wood furnish which causes the acceleration in cure by the buffering salt catalyst. Additionally, the buffering salt catalyst outperformed the pH adjusted system containing sodium chloride. The phosphate buffering employed in Example 14 does not buffer in the presumed cure range of particleboard resins during panel production (pH 4.0–6.0 is the natural pH of most wood/water mixtures). In the current examples, pH control is obviously not the mechanism of acceleration, since the buffering salt employed did not buffer in the pH range of cure.

EXAMPLE 17

This experiment was conducted to illustrate how buffering salts other than dipotassium phosphate will also catalyze the cure of UF resins. The 100° C. boiling water gel test is a method commonly employed in the wood adhesives industry to help predict the cure speed of resins. This test records the time required for gelation of the adhesive when placed in an aluminum cup and then subjected to 100° C. boiling water. For this Example, the test was conducted by adding 10 milliliters of a 12% aqueous salt solution to 120 grams resin (10 milliliters of water for the control). This resulted in a binder containing resin and about 1% salt based on total weight of resin, the same as in the particleboard examples above. The resin plus salt was then adjusted to pH 4.0 using the appropriate acid for each buffering salt tested for Sample 1 through 13. For instance, acetic acid was used to adjust the pH of the resin containing sodium acetate. Phosphoric acid was used for the sodium formate containing sample. Phosphoric acid was employed to adjust the pH of the control and all neutral, or non-buffering salts tested as samples 1 through 6. The resin employed was a 1:1 U:F mole ratio particleboard type resin. All gel times reported are the average of two separate gel times, except for the control, which is an average of 8 tests. The results are reported by TABLE X.

TABLE X

| SAMPLES | SALT | MINUTES |
|---|---|---|
| 1 | Control (10 ml water) | 16.8 |
|  | Neutral Salts |  |
| 2 | Potassium chloride | 15.1 |
| 3 | Sodium sulfate | 12.3 |
| 4 | Sodium chloride | 17.5 |
| 5 | Magnesium chloride | 15.1 |
| 6 | Magnesium sulfate | 13.2 |
|  | Buffering Salts |  |
| 7 | Dipotassium phosphate | 4.6 |
| 8 | Tripotassium phosphate | 4.2 |
| 9 | Disodium phosphate | 4.2 |
| 10 | Monosodium phosphate | 5.3 |
| 11 | Sodium acetate | 3.5 |
| 12 | Sodium formate | 3.9 |
| 13 | Trisodium citrate | 3.3 |

These results show the catalytic influence of all buffering salts when used in this manner. Even though several of the tested neutral salts are commonly employed as UF resin catalysts, none accelerated cure as did the buffering salts.

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended hereto.

What is claimed is:

1. A binder composition comprising a mixture of:
   a first aqueous solution comprising at least one buffering salt catalyst, the first aqueous solution having a pH of about 3.5 to about 8.5; and
   a second aqueous solution comprising urea and formaldehyde resin having a urea:formaldehyde molar ratio ranging from about 0.7 to about 1.67:1, wherein the second aqueous solution comprises about 10 to about 40 weight percent of free urea;
   wherein the amount of the at least one buffering salt in the mixture equals about 0.05 to about 15 percent of the weight of the second aqueous solution, and about 0 to about 2 weight percent of the second aqueous solution is free formaldehyde.

2. The binder composition of claim 1, the first aqueous solution further comprising an acid.

3. The binder composition of claim 1, the first aqueous solution having a pH of about 3.5 to about 6.

4. The binder composition of claim 1, wherein the pH of the first aqueous solution is about 4 to about 5.

5. The binder composition of claim 1, wherein the buffering salt catalyst comprises a member of the group consisting of monopotassium phosphate, dipotassium phosphate, tripotassium phosphate, trisodium phosphate, sodium acetate, sodium citrate, borates, phthalates, bicarbonates and mixtures thereof.

6. The binder composition of claim 1, wherein the urea:formaldehyde molar ratio is about 0.62 to about 1.67:1 and the second aqueous solution contains about 10 to about 30 weight percent free urea.

7. The binder composition of claim 1, further comprising a member of the group consisting of wood furnish for particleboard manufacture, fiber for medium density fiberboard, wood veneer for plywood manufacture, and fiberglass for glass mat.

8. The binder composition of claim 1, wherein the urea-formaldehyde resins are selected from the group consisting of melamine-modified urea-formaldehyde resins, ammonia-modified urea-formaldehyde resin, and phenol-modified urea-formaldehyde resins.

9. The binder composition of claim 1, wherein the buffering salt is present in an amount equal to 0.5 to about 5 weight percent of the second aqueous solution.

10. The binder composition of claim 1, further comprising at least one member of the group consisting of sodium chloride, sodium sulfate, magnesium chloride, magnesium sulfate, ammonium sulfate, ammonium formate, ammonium phosphate, ammonium acetate, ammonium chloride and mixtures thereof.

11. The binder composition of claim 1, wherein the first aqueous solution further comprises at least one member of the group consisting of ammonium sulfate and sodium sulfate.

12. The binder composition of claim 1, wherein the buffering salt has a buffering range and the pH of the first solution is below the buffering range.

13. The binder composition of claim 1, wherein the buffering salt has a buffering range and the pH is in the lower half of the buffering range.

14. The binder composition of claim 1, wherein the buffering salt has at least one buffering range and the pH of the first solution is outside any buffering range of the buffering salt.

15. A method of achieving rapid cure of urea-formaldehyde resin comprising the steps of:

mixing a first aqueous solution comprising at least one buffering salt, the first aqueous solution having a pH of about 3.5 to about 8.5, with a second aqueous solution comprising urea and formaldehyde resin in a molar ratio of about 0.33 to about 1.67:1, wherein the second aqueous solution comprising about 10 to about 40 weight percent of free urea, to form a binder;

wherein the amount of the at least one buffering salt in the first aqueous solution equals about 0.5 to about 15 weight percent of the weight of the second aqueous solution, and about 0 to about 2 weight percent of the second aqueous solution is free formaldehyde.

16. The method of claim 15, further comprising including an acid in the first aqueous solution.

17. The method of claim 15, further comprising adding sufficient acid to the first aqueous solution to adjust the pH to at most a lower half of a buffering range of the buffering salt.

18. The method of claim 15, further comprising mixing the binder with a substrate, wherein the first and second aqueous solutions are mixed to form the binder just prior to mixing the binder with the substrate.

19. The method of claim 15, further comprising at least partially neutralizing a buffer effect of the buffering salt by addition of an acid to the first aqueous solution prior to mixing the first and second aqueous solutions.

20. The method of claim 19, wherein the buffer effect is entirely neutralized.

21. The method of claim 15, wherein the pH of the first aqueous solution is about 3.5 to about 6.

22. The method of claim 15, wherein the first aqueous solution comprises the buffering salt in an amount equal to about 0.5 to about 5 weight percent of the second aqueous solution.

23. The method of claim 15, wherein the urea:formaldehyde molar ratio is about 0.62 to about 1.67:1 and the second aqueous solution contains about 10 to about 30 weight percent free urea.

24. The method of claim 15, wherein the pH of the first aqueous solution is about 4 to about 5.

25. The method of claim 15, further comprising combining the binder with a substrate selected from the group consisting of wood furnish for particleboard manufacture, fiber for medium density fiberboard, wood veener for plywood, and fiberglass for glass mat.

26. The method of claim 15, wherein the buffering salt comprises a member of the group consisting of monopotassium phosphate, dipotassium phosphate, tripotassium phosphate, sodium acetate, sodium citrates, borates, phthalates, bicarbonates and mixtures thereof.

27. The method of claim 15, further comprising mixing a member of the group consisting of sodium chloride, sodium sulfate, magnesium chloride, magnesium sulfate, ammonium sulfate, ammonium formate, ammonium phosphate, ammonium acetate, ammonium chloride and mixtures thereof with the first aqueous solution.

28. The method of claim 15, wherein the pH of the first aqueous solution is below a buffering range of the buffering salt.

29. The method of claim 15, wherein the pH of the first aqueous solution is in a lower half of a buffering range of the buffering salt.

30. The method of claim 15, wherein the buffering salt has at least one buffering range and the pH of the first solution is outside any buffering range of the buffering salt.

31. The binder composition of claim 1, wherein the buffering salt has more than one buffering range and the pH of the first solution is:

(i) in the lower half of one of the buffering ranges, or (ii) below at least one of the buffering ranges and not within any of the buffering ranges.

32. The binder composition of claim 1, wherein the buffering salt has more than one buffering range and the pH of the first solution is:

(i) in the lower quarter of one of the buffering ranges, or (ii) below at least one of the buffering ranges and not within any of the buffering ranges.

33. The binder composition of claim 1, wherein the urea-formaldehyde molar ratio is about 0.9 to about 1.67:1.

34. The binder composition of claim 1, wherein the buffering salt is present in an amount equal to about 0.7 to about 5 weight percent of the second aqueous solution.

35. The binder composition of claim 1, wherein the buffering salt is present in an amount equal to about 1 to about 5 weight percent of the second aqueous solution.

36. The binder composition of claim 1, wherein the urea and formaldehyde resin is the reaction product of a process comprising the steps of:

forming a reaction mixture having a urea:formaldehyde mole ratio of about 0.4 to about 0.6:1, and reacting the reaction mixture at a pH from about 7.0 to about 8.5 and a temperature from about 140° to about 212° F. to form addition products selected from mono-, di- and tri- methylol urea and mixtures thereof;

reducing the pH of the mixture to below 7.0 to initiate a condensation reaction to transform the methylol urea to methylene linked oligomers and convert the oligomers to methylene linked polymers to form a polymer-containing mixture;

neutralizing the polymer-containing mixture, and adding urea to the neutralized polymer-containing mixture.

37. The binder composition of claim 36, wherein the process further comprises adding sodium hydroxide or amine to the mixture of urea and formaldehyde to form the reaction mixture.

38. The method of claim 15, further comprising making the urea and formaldehyde resin by:

forming a reaction mixture having a urea:formaldehyde mole ratio of about 0.4 to about 0.6:1, to form the reaction mixture and reacting the reaction mixture at a pH from about 7.0 to about 8.5 and a temperature from about 140° to about 212° F. to form addition products selected from mono-, di- and tri- methylol urea and mixtures thereof;

reducing the pH of the mixture to below 7.0 to initiate a condensation reaction to transform the methylol ureas to methylene linked oligomers and convert the oligomers to methylene linked polymers to form a polymer-containing mixture;

neutralizing the polymer-containing mixture, and adding urea to the neutralized polymer-containing mixture.

39. The method of claim 38, further comprising adding sodium hydroxide or amine to the mixture of urea and formaldehyde to form the reaction mixture.

40. The method of claim 15, wherein the buffering salt has more than one buffering range and the pH of the first solution is:

(i) in the lower half of one of the buffering ranges, or (ii) below at least one of the buffering ranges and not within any of the buffering ranges.

41. A binder composition comprising a mixture of:

a first aqueous solution comprising at least one buffering salt catalyst, the first aqueous solution having a pH of about 2 to about 8.5; and a second aqueous solution of urea and formaldehyde resin having a urea:formaldehyde molar ratio ranging from about 0.33 to about 1.67:1;

wherein the amount of the at least one buffering salt in the mixture equals about 0.05 to about 15 percent of the weight of the second aqueous solution, and about 0 to about 2 weight percent of the second aqueous solution is free formaldehyde, wherein the buffering salt catalyst comprises a member of the group consisting of monopotassium phosphate, dipotassium phosphate, tripotassium phosphate, sodium acetate, sodium citrate, borates, phthalates, bicarbonates and mixtures thereof.

42. The binder composition of claim 39, wherein the buffering salt catalyst is selected from the group consisting of monopotassium phosphate, dipotassium phosphate, tripotassium phosphate, sodium acetate, sodium citrate, phthalates, bicarbonates and mixtures thereof.

43. A method of achieving rapid cure of urea-formaldehyde resin comprising the steps of:

mixing a first aqueous solution comprising at least one buffering salt, the first aqueous solution having a pH of about 2 to about 8.5, with a second aqueous solution comprising urea and formaldehyde resin in a molar ratio of about 0.33 to about 1.67:1, to form a binder;

wherein the amount of the at least one buffering salt in the first aqueous solution equals about 0.05 to about 15 weight percent of the weight of the second aqueous solution, and about 0 to about 2 weight percent of the second aqueous solution is free formaldehyde, wherein the buffering salt comprises a member of the group consisting of monopotassium phosphate, dipotassium phosphate, tripotassium phosphate, sodium acetate, sodium citrates, borates, phthalates, bicarbonates and mixtures thereof.

* * * * *